United States Patent [19]

Schmidt et al.

[11] 4,247,845
[45] Jan. 27, 1981

[54] CONTROL DATA INPUT DEVICE FOR THE ELECTRONIC CONTROL UNIT OF AN ELECTRICAL HOUSEHOLD APPLIANCE

[75] Inventors: Ulrich Schmidt, Rothenberg; Klaus Fischer, Nuremberg, both of Fed. Rep. of Germany

[73] Assignee: Licentia Patent-Verwaltungs-G.m.b.H, Frankfurt am Main, Fed. Rep. of Germany

[21] Appl. No.: 863,157

[22] Filed: Dec. 22, 1977

[30] Foreign Application Priority Data

Dec. 23, 1976 [DE] Fed. Rep. of Germany ....... 2658436

[51] Int. Cl.³ .............................................. G08G 9/00
[52] U.S. Cl. .......................... 340/365 R; 340/365 VL; 340/706; 340/802
[58] Field of Search ............ 340/365 R, 365 C, 365 S, 340/338, 337, 706, 802, 365 VL; 364/200, 900; 219/10.55 E, 414, 508, 10.55 B; 331/40

[56] References Cited

U.S. PATENT DOCUMENTS

| 3,806,832 | 4/1974 | Channing et al. | 331/40 |
| 3,932,723 | 1/1976 | Tamano et al. | 219/10.55 B |
| 3,974,472 | 8/1976 | Gould | 340/365 C |
| 4,001,536 | 1/1977 | Eberhardt | 340/365 C |
| 4,023,161 | 5/1977 | Sasaki | 340/365 R |
| 4,035,795 | 7/1977 | Fosnough et al. | 340/365 C |
| 4,121,284 | 10/1978 | Hyatt | 340/365 E |

FOREIGN PATENT DOCUMENTS 1246280  9/1971  United Kingdom.
1322128  7/1973  United Kingdom.

OTHER PUBLICATIONS

"Cookbit"—The First Kitchen Computer, AEG.

*Primary Examiner*—John W. Caldwell, Sr.
*Assistant Examiner*—James J. Groody
*Attorney, Agent, or Firm*—Spencer & Kaye

[57] ABSTRACT

A control data input device for use with an electrical household appliance such as an electronic range to control the operation modes, times, temperatures and cooking duration of the appliance. A selector dial calibrated in a plurality of codes automatically addresses a data store through a switching means when one of the codes is selected by rotation at the dial. A second dial is provided to enter control information into the selected address at a variable transfer rate selected by turning this second dial. A digital display and display driver are provided to display the information as it is addressed and stored in the data store. The code selector dial is provided with function indicators and indicator lights to visually inform the operator as to which code has been selected.

3 Claims, 3 Drawing Figures

CONTROL DATA INPUT DEVICE FOR THE ELECTRONIC CONTROL UNIT OF AN ELECTRICAL HOUSEHOLD APPLIANCE

BACKGROUND OF THE INVENTION

The present invention relates to a control data input device for the electronic control unit of an electrical household appliance, particularly an electronic range, having a digital display of the control information entered.

A known device of this type described in the prospectus "COOKBIT"—Der erste Küchen computer [the First Kitchen Computer]—by the firm AEG, includes a central data input through which, for example, the respectively required cooking and roasting temperatures as well as the cooking, baking and roasting times can be entered.

A plurality of pushbuttons with various identifying characters are used in this device to enter the data. Upon actuation of the respective pushbutton, the selected cooking, roasting or baking information, e.g., temperature, end of cooking time, roasting or baking selection and duration, are digitally displayed at a central location. In this device, however, a plurality of pushbuttons are required for input of the program and control data for which a considerable amount of space must be provided and which entails a bulky connection with the control unit. Moreover, the actuation of the individual pushbuttons to enter the proper data required a great deal of attention on the part of the operator so that errors often occured.

SUMMARY OF THE INVENTION

It is an object of the present invention to provide a control unit for an electrical appliance which does not require pushbuttons to enter control information.

It is another object of this invention to provide a control unit for an electrical appliance which includes a dial for selecting the type of information to be entered. These and other objects are accomplished according to the present invention by constituting the device of a rotatable dial with identifying characters for the codes of a data store to be selected and entered. The selection of a code by the dial automatically addresses the data store via switching or control means and the respective program or control data magnitude can thereafter be written into the data store in a clock pulse rhythm with the aid of a counter which is actuated by a centrally located input knob. The present invention simplifies the operation of an electrical appliance by enabling clearer input of the program and control data into the appliance so that input errors are substantially eliminated.

It is yet another object of this invention to provide a control unit for an electrical appliance wherein the entry of control information is controlled by a variable frequency oscillator.

Still another object of this invention is to provide a control unit for an electrical appliance which includes symbolic representations of the type of data calibrations to be entered into a control memory.

BRIEF DESCRIPTION OF THE DRAWINGS

FIG. 1b shows another form of construction for the device of FIG. 1a.

DESCRIPTION OF THE PREFERRED EMBODIMENTS

Figure 1A:
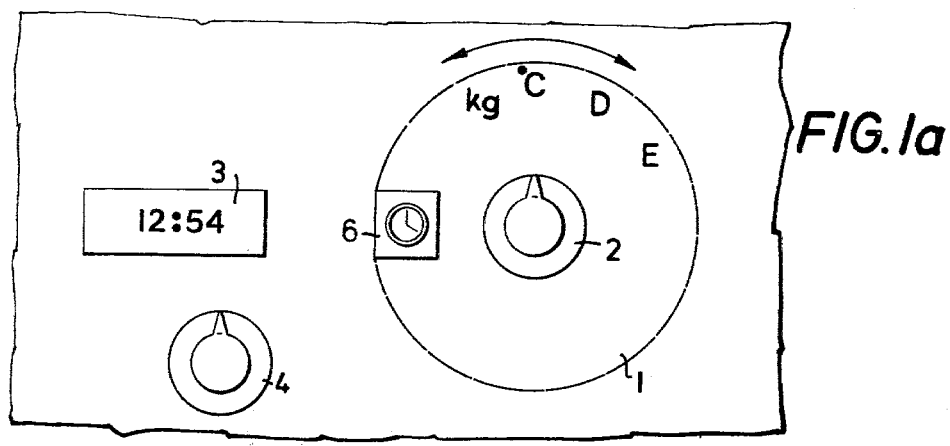
FIG. 1a is a schematic, pictorial view of an input device according to the invention in one setting position.

One embodiment of the invention is illustrated in the drawings and will be described in detail in connection therewith. The drawings show only the basic structure which is necessary to understand the invention, for example, in connection with an electrical range.

Figure 1B:
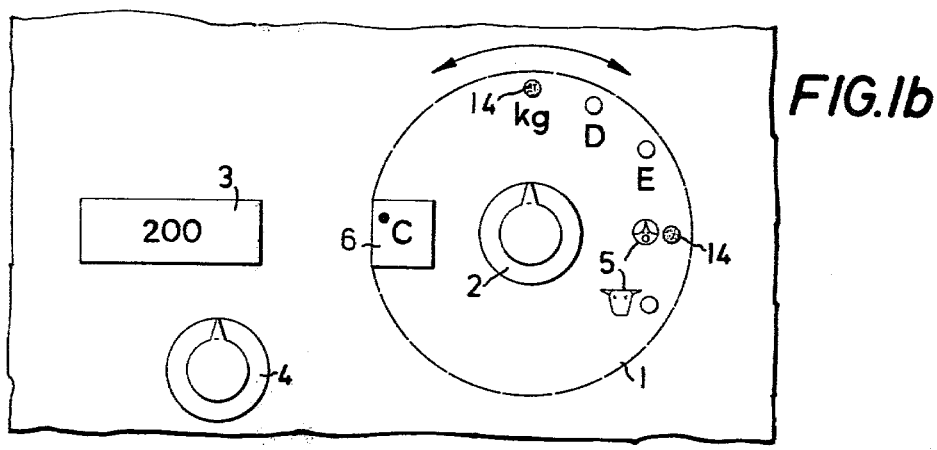

The device shown in FIGS. 1a and 1b which may be accommodated, for example, in the switch box of a range where the box is provided with a cover, or in a separate control box as used, for example, for built-in units, includes a dial 1 disposed behind a glass cover and a centrally located dial knob 2 projecting out of the cover to rotate the dial. An indicator display 3 is coupled to dial 1 and to a central input knob 4. Dial 1 serves to select the type of information to be displayed while knob 4 is employed for feeding in the program and control data.

The dial 1 is provided with various identifying characters such as Kg for weight of item to be cooked, °C. for cooking temperature, D for duration, E for end time, as well as symbols 5 (FIG. 1b) identifying the various types of meat. The dial 1 has associated with it a display window 6 disposed precisely opposite the digital indicator display 3. This has the advantage that the data appearing on display 3 always has the associated identifying character or symbol to its right in display window 6. In this way, the selected setting or the stored setting, respectively, can be easily read out from display 3 without error. For example, in FIG. 1a, the time appearing in indicator display 3 has opposite it, in the display window 6 of dial 1, a clock symbol. In FIG. 1b, the symbol °C. is opposite the data appearing on display 3, i.e. the temperature of 200° C. has been selected or stored, respectively.

Figure 2:
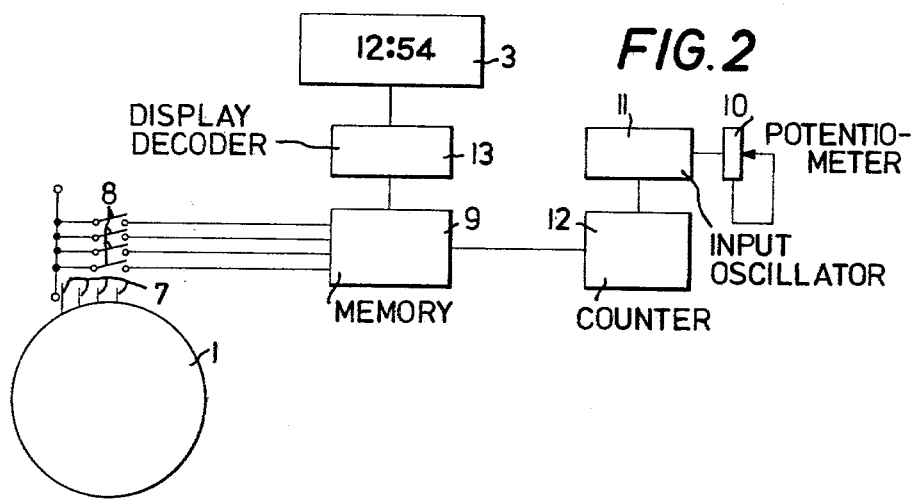
FIG. 2 is a block circuit diagram illustrating the circuiting of such input device.

As shown in FIG. 2, a plurality of switching cams 7 are associated with dial 1, namely one switching cam for each data bit. Each one of the switching cams 7 switches a respective electrical contact 8, producing an electrical connection with an addressable data storage or memory 9 and thereby generating a certain code which addresses the memory.

Instead of the switching cams 7 and contacts 8, it is also possible to use phototransistors which are illuminated by lamps. For this purpose dial 1 is provided with so-called shadow masks which uncover a respective lamp in accordance with the position of the dial, and thus the selected code, so that this lamp can illuminate a phototransistor which then selects the address for the memory. In an advantageous manner, the dial with the shadow mask could be made interchangeable so that dials with different arrangements of shadow masks could be used and thus different programs could be employed.

If the selected or set code, respectively, is being addressed into memory 9, the frequency of an oscillator 11 is varied with the aid of the central input knob 4 acting on a potentiometer 10. If the input knob 4 is turned completely to the left, the frequency is zero and if it is turned completely to the right, the frequency is at a maximum. The present position of the potentiometer thus determines the speed with which the individual digits for the respective program and control data are either set or entered. A counter 12 produces a clock pulse which is varied in accordance with the respective setting of oscillator 11. The desired data is written into memory 9 and is supplied to display 3 via a known 7-segment decoder and driver 13.

The program and control data which have been fed in or stored, respectively, are displayed by lighting a lamp 14 (FIG. 1b) associated with the respective identifying character on the dial 1. This identifies to the user of the device that identifying character with which the displayed data is associated. It will be understood that the above description of the present invention is susceptible to various modifications, changes and adaptations, and the same are intended to be comprehended within the meaning and range of equivalents of the appended claims.

What is claimed is:

1. A device for introducing predetermined input data into the electronic control unit of an electrical household appliance comprising digitial display means for displaying the magnitude of said input data, addressable data storage means having a plurality of addresses and an output coupled to said digital display means, code selector means for selecting the type of input data to be stored in said storage means, said code selector means including a rotatable dial having a plurality of characters on the face thereof for identifying codes corresponding to addresses in said data storage means, a display window in said dial located opposite said digital display means for displaying an indicator corresponding to a selected code, and a switching cam for each type of input data, a control knob affixed to said dial for rotation thereof for selection of said codes, and a lamp associated with each of said plurality of characters to indicate which of the codes in said data storage means has been selected, switching means including a plurality of contacts each associated with one of said switching cams for coupling said code selector means to a corresponding address in said storage means, and variable oscillator means including a variable frequency oscillator and a counter coupled to said data storage means for generating clock pulses at a rate proportional to the frequency of said oscillator and corresponding to the magnitude of the selected type of input data to be stored at said corresponding address of said data storage means.

2. An arrangement as defined in claim 1 wherein said variable oscillator means further comprises a potentiometer coupled to said variable frequency oscillator and an input knob connected to said potentiometer for varying the frequency of the oscillations produced by said oscillator.

3. An arrangement as defined in claim 1 wherein the appliance is a kitchen range.

* * * * *